US 6,682,452 B2

(12) United States Patent
Quintus

(10) Patent No.: US 6,682,452 B2
(45) Date of Patent: Jan. 27, 2004

(54) BELT TENSIONER WITH PIVOT BUSHING

(75) Inventor: James G. Quintus, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 14 days.

(21) Appl. No.: 10/075,898

(22) Filed: Feb. 14, 2002

(65) Prior Publication Data

US 2003/0153422 A1 Aug. 14, 2003

(51) Int. Cl.⁷ .................................................. F16H 7/12
(52) U.S. Cl. ........................................................ 474/135
(58) Field of Search ................................. 474/135, 133, 474/138, 109, 117; 403/33, 16, 28, 225

(56) References Cited

U.S. PATENT DOCUMENTS

| | | | |
|---|---|---|---|
| 4,596,538 A | | 6/1986 | Henderson |
| 4,698,049 A | * | 10/1987 | Bytzek et al. .............. 474/135 |
| 4,832,666 A | | 5/1989 | Henderson |
| 4,938,734 A | | 7/1990 | Green et al. |
| 5,030,172 A | | 7/1991 | Green et al. |
| 5,035,679 A | | 7/1991 | Green et al. |
| 5,190,502 A | | 3/1993 | Gardner et al. |
| 5,348,514 A | | 9/1994 | Foley |
| 5,443,424 A | | 8/1995 | Henderson |
| 5,772,549 A | * | 6/1998 | Berndt et al. .............. 474/135 |
| 5,795,257 A | * | 8/1998 | Giese et al. ............... 474/135 |
| 5,961,219 A | * | 10/1999 | Maughan .................... 384/220 |
| 5,967,919 A | * | 10/1999 | Bakker ........................ 474/135 |
| 6,004,235 A | * | 12/1999 | Ohta et al. ................... 474/109 |
| 6,354,614 B1 | * | 3/2002 | Ham et al. ............ 280/124.11 |
| 6,458,055 B1 | * | 10/2002 | Bellamy-Booth ........... 474/135 |
| 2002/0119850 A1 | * | 8/2002 | Dutil ........................... 474/135 |

FOREIGN PATENT DOCUMENTS

DE     3018221 A1  * 11/1981     ............. B25C/1/14

* cited by examiner

*Primary Examiner*—Marcus Charles
(74) *Attorney, Agent, or Firm*—Joseph V. Tassone; Thompson Hine LLP

(57) ABSTRACT

A belt tensioner for a power transmission belt is provided that operates on an endless path and that utilizes asymmetric motion control. The belt tensioner has an arm with a belt engaging section and a drum section, a support member for securing the tensioner relative to the belt, where the arm pivots about the support member, and a tension spring that urges the arm to pivot about the support member in a first direction and urges the belt engaging section against the belt with a force to tension the belt. The belt tensioner further comprises a cavity between the arm and the support member and a bushing comprising a bowed flange positioned in the cavity.

18 Claims, 3 Drawing Sheets

BELT TENSIONER WITH PIVOT BUSHING

FIELD OF THE EMBODIMENTS

The embodiments relate to a new method and apparatus for a belt tensioner.

BACKGROUND

Many automobile engines currently on the market utilize an endless power transmission belt for driving a plurality of driven accessories. They employ a tensioning system utilized to provide a tensioning force on the endless power transmission belt, which may be of any suitable type known in the art. Preferably, the belt is made primarily of a polymeric. KEVLAR or Aramid material because the unique features of the tensioner of this invention readily permit the tensioner to tension a belt having a polyester load-carrying cord in an efficient manner.

In many of these automotive accessory drives it is necessary to provide a correct tension to control a tension ratio throughout the life of the belt. With the advent of the single belt V-ribbed drive system, this is of increasing importance since belts are longer and some accessories are driven off the backside of the belt as a flat belt drive. Automatic tensioners of various descriptions have been developed having the requisite characteristics enabling them to tune the belt system to remove input torsionals and prevent or reduce harmonics, while allowing the tensioner to respond to changes in the belt tension requirements. For instance, see U.S. Pat. Nos. 4,596,538, 4,832,666, and 5,443,424 to Henderson, U.S. Pat. Nos. 4,938,734, 5,030,172 and 5,035,679 to Green, et. al., U.S. Pat. No. 5,190,502 to Gardner, et. al., or U.S. Pat. No. 5,348,514 to Foley, all now incorporated into this application by this reference thereto.

A section of prior art tensioners, as seen in FIGS. 7–8, includes a bushing 100 with a tapered outer diameter 102, a straight inner diameter 104, and a flat flange 106. Use of this bushing 100 results a large gap 108 between a hub section 110 of a support 112 and an arm 114. A problem exists because any axial movement of the bushing 100 will either increase or decrease clearance in the gap 108 between the bushing 100 and the arm 114. Ideally, the clearance in the gap 108 between the bushing 100 and the arm 114 should be zero because minimizing this clearance in the gap 108 is one of the ways to control alignment of the arm 114. However, zero clearance can lead to the arm 114 freezing on the hub 110, thus some clearance is needed. If alignment is not controlled, the tensioner can become unstable and the belt can slip off the tensioner pulley. If this happens, the belt can vibrate and jump off other pulleys in the engine, which can cause the engine to stop functioning. This prior art bushing may also include grooves 131 on either or both of an outside surface (not shown) and inside surface 133B to hold and distribute grease or lubricants.

SUMMARY

Several embodiments provide a tensioner for a power transmission belt that operates on an endless path. The tensioner comprises an arm comprising a belt engaging section and a drum section, a support member for securing the tensioner relative to the belt, the arm pivoting about the support member, and a spring that urges the arm to pivot about the support member in a first direction and urges the belt engaging section against the belt with a force to tension the belt. The tensioner further comprises a cavity between the arm and the support member and a bushing comprising a bowed flange positioned in the cavity.

Another aspect is to provide a bushing with a straight inner diameter and a tapered outer diameter. Another aspect is to provide a bushing with an inner surface comprising a fixed diameter and an tapered outer surface.

Another aspect is to provide a bushing with a flange comprising cutout sections.

Another aspect is to provide a bushing whose bowed flange biases the bushing against the arm. Another aspect is to provide a bushing whose bowed flange biases the bushing along its longitudinal axis.

Another aspect is to provide a housing for the spring in the tensioner.

Another aspect is to provide a hub on the support member about which the arm pivots.

Another aspect is to provide a new method for utilizing a belt tensioner, the method of having one or more of the novel features as set forth above or hereinafter shown or described.

Several embodiments provide a method of utilizing a tensioner for a power transmission belt that operates on an endless path. The method comprises the steps of providing an arm comprising a belt engaging section and a drum section, providing a support member for securing the tensioner relative to the belt, the arm pivoting about the support member, and providing a spring that urges the arm to pivot about the support member in a first direction and urges the belt engaging section against the belt with a force to tension the belt. The method comprises the further steps of providing a cavity between the arm and the support member and providing a bushing comprising a bowed flange positioned in the cavity.

Other objects, uses, and advantages are apparent from a reading of this description, which proceeds with references to the accompanying drawings form a part thereof and wherein:

DESCRIPTION OF THE PREFERRED EMBODIMENTS

Figure 1:
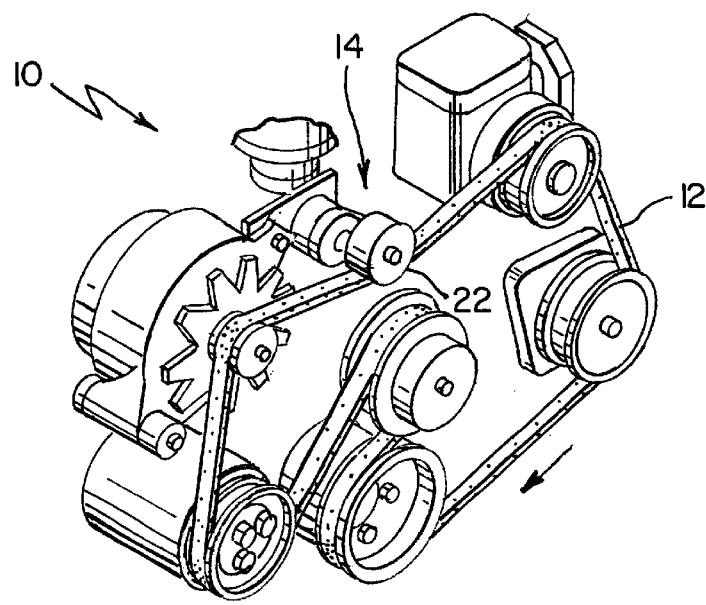
FIG. 1 is a perspective view of an automobile engine that utilizes the new belt tensioner.

While the various features are hereinafter illustrated and described as providing a belt tensioner for a particular power transmission belt of a particular motor vehicle engine, it is to be understood that the various features can be utilized singly or in any combination thereof to provide a belt tensioner for other arrangements as desired. Therefore, the embodiments are not to be limited to only the embodiments illustrated in the drawings, because the drawings are merely utilized to illustrate one of the wide variety of uses.

Referring now to FIG. 1, an automobile engine is generally indicated by reference numeral 10 and utilizes an endless power transmission belt 12 for driving a plurality of driven accessories, as is well known in the art. The new belt tensioner is generally indicated by reference numeral 14 and is utilized to provide a predetermined tensioning force on the belt 12 in a manner hereinafter set forth. The endless power transmission belt 12 may be of any suitable type known in the art. The belt 12 may be made primarily of polymeric material because the unique features of the tensioner 14 readily permit the tensioner 14 to tension a belt having a load carrying cord in an effective manner as fully set forth in the aforementioned patent to Henderson, U.S. Pat. No. 4,596,538 whereby this U.S. Patent is being incorporated into this disclosure by reference.

Figure 2:
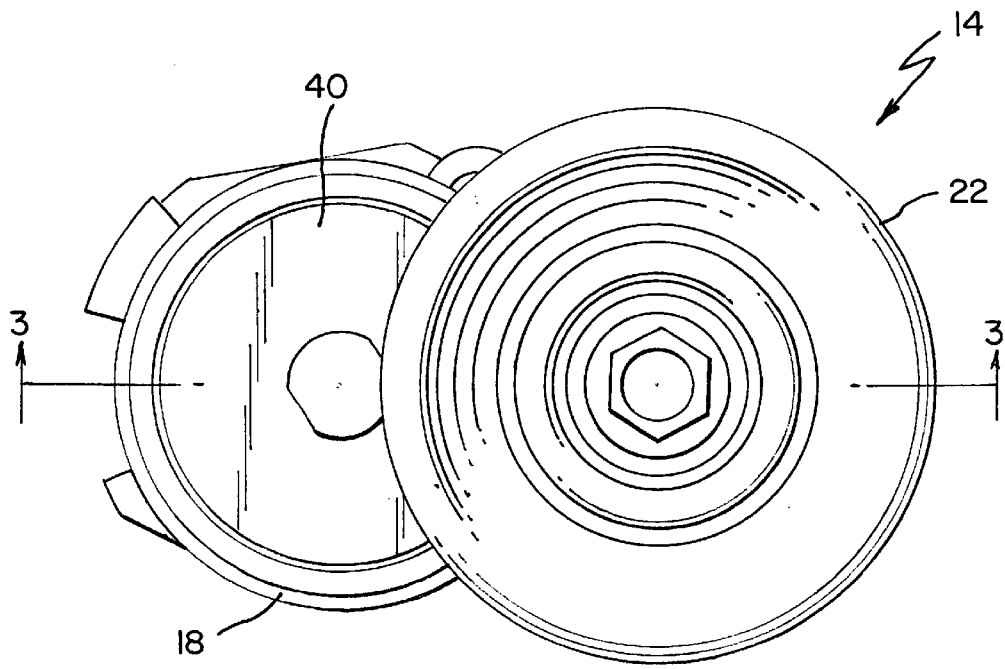
FIG. 2 is a top view of the tensioner.
Figure 3:
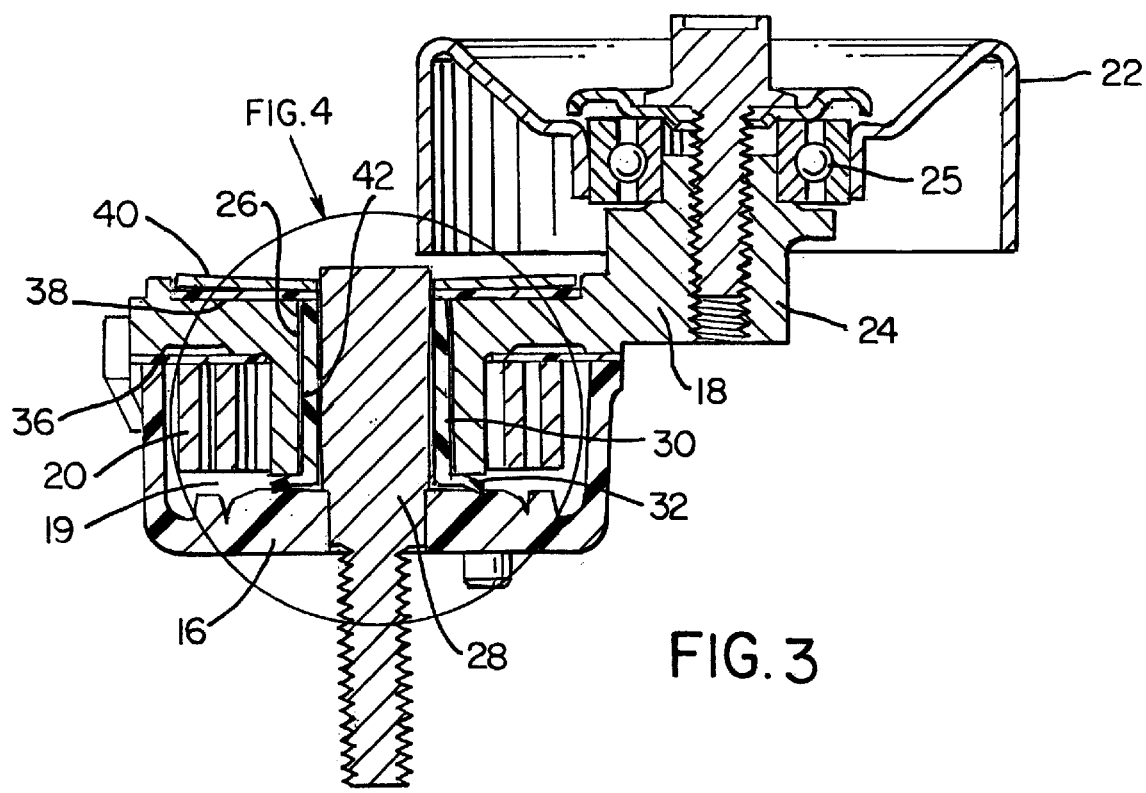
FIG. 3 is a section view looking into the tensioner at line 3—3 in FIG. 2.

As best illustrated in FIGS. 2–3, the new belt tensioner 14 comprises a support member 16 formed of any suitable, maybe polymeric material, which is configured to be fixed to a mounting bracket or support structure of the engine 10 by any known fastening devices extending through suitable apertures in the support member 16 as fully set forth in the aforementioned patent to Henderson, U.S. Pat. No. 5,443,424. A belt engaging arm 18 is moveably carried by the support member 16 in a manner hereinafter set forth, and may be die cast of any suitable material, such as a metallic or aluminum material.

The tensioner 14 further includes a housing 19 that houses a spring 20, where the spring 20 has an outer end that is operatively interconnected to the support member 16 and an inner end that is operatively interconnected to the belt engaging arm 18. The spring 20 comprises a substantially flat, metallic member wound in a spiral manner to define spirals or coils, where an inner spiral is adjacent the inner end and an outer spiral is adjacent the outer end. The spring 20 has been wound up in such a manner that when it is disposed in the tensioner 14, the spring 20 urges a belt engaging pulley 22 of the belt engaging arm 18 against the belt 12 to tension the same with a predetermined tension in a manner fully set forth in the above-mentioned patents. Although, a spiral flat cross section spring may be used because it takes up less space in the tensioner, as is know in the art any spring may be utilized, such as a helical coil round cross-section, compression, or tension linear spring that, while less expensive, take up more room in the housing 19 because they have a longer barrel. The belt engaging pulley 22 is rotatably mounted to an end 24 of the arm 18 by suitable bearings 25 in a manner well known in the art.

Figure 4:
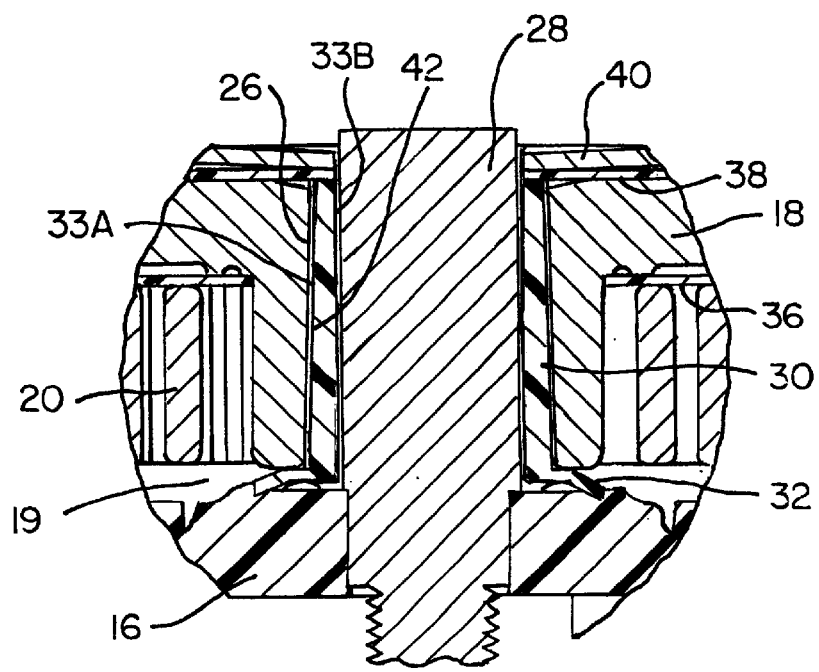
FIG. 4 is a zoomed view of a section of the tensioner circled in FIG. 3.
Figure 5:
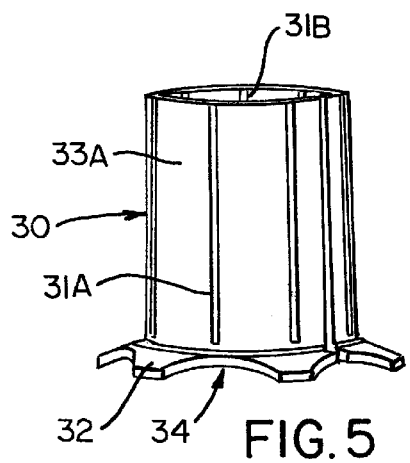
FIG. 5 is side view of a bushing in the tensioner.
Figure 6:
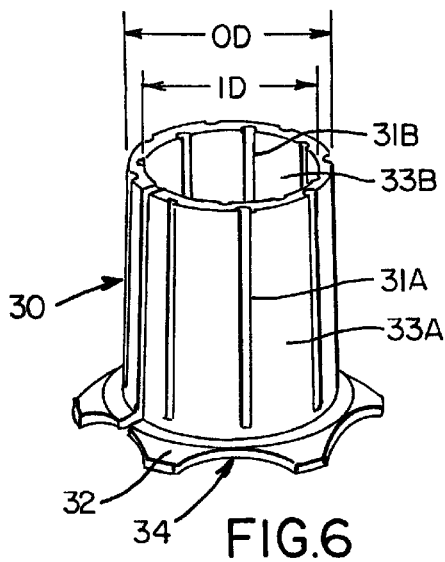
FIG. 6 is a perspective view of a bushing in the tensioner.
Figure 7:
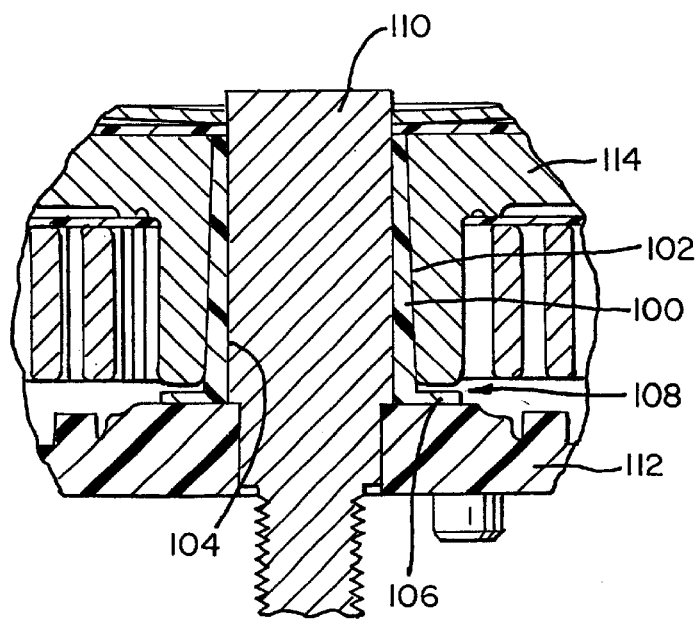
FIG. 7 is a zoomed view of a section of a prior art tensioner.
Figure 8:
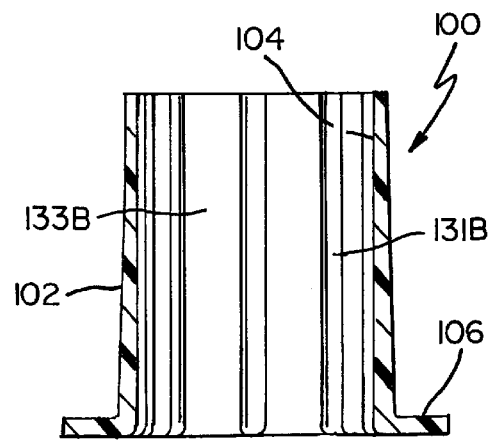
FIG. 8 is a side view of a bushing in a prior art tensioner.

Turning now to FIGS. 4–6, with continuing reference to FIG. 3, the belt engaging arm 18 forms a cavity 26 defined between the arm 18 and a hub section 28 of the support 16, where the hub section 28 may have a tapered outer surface. Within the cavity 26 there is a bushing 30 that may comprise grooves 31, where a set of grooves 31A are in an outside surface 33A and a set of grooves 31B are in an inside surface 33B. The grooves 31 are optional in the bushing 30, and are utilized to hold and spread grease or other lubricants, if that is needed. The bushing 30 further comprises a bowed flange 32, where the bowed flange 32 may comprise cutout sections 34. The curved shape of the bowed flange 32 has a resilient nature to it, similar to a spring, to bias the bushing 30 against the arm 18 and to axially bias the bushing along its longitudinal axis. As seen in FIG. 6, the bushing 30 has a fixed diameter inner surface 33B, i.e., a straight inner diameter ID, and a tapered outer surface 33A, i.e., an outer diameter OD, and may be manufactured from a moldable material, such as nylon or the like. The tensioner 14 further includes a first bearing 36 that is located adjacent the spring 20 and a second bearing 38 is located between the arm 18 and a closing device 40. The bearings 36 and 38 may be manufactured from high-grade nylon with reinforcement for compressive and shear strength, and microscopic porosity to retain grease, as manufactured by DuPont and Dow.

In operation, the bowed flange 32 provides a biasing force through a spring-like action against the support 16 to bias the bushing 30 axially along its longitudinal axis and up against the arm 18, which minimizes any clearance in a gap 42 between the arm 18 and the bushing 30, while still maintaining enough clearance in the gap 42 for proper operation, where the clearance may be at least slightly above zero. The cutout sections 34 of the flange 32 may be required to lessen the biasing force of the bushing 30 against the arm 18 in some circumstances. In alternative embodiments, the bowed flange 32 may not have any removed or cutout sections.

Other embodiments include a method of utilizing a tensioner for maintaining a predetermined tension on a power transmission belt to be operated on an endless path. The method comprises a first step of providing an arm comprising a belt engaging section and a drum section. A second step of the method provides a support member configured to be secured relative to the belt, the support member comprising a hub having a longitudinal axis and being fixed from movement relative to the belt engaging section, the hub moveably holding the arm. A third step of the method provides a spring operatively interconnected to the arm and the support member, the spring being configured to urge the belt engaging section relative to the support member and against the belt with a force to provide the predetermined tension on the belt. A fourth step of the method comprises providing a cavity between the arm and the support member. Finally, a fifth step of the method comprises providing a bushing comprising a bowed flange positioned in the cavity.

The embodiments have been described in detail with respect to specific embodiments thereof, but it will be apparent that numerous variations and modifications are possible without departing from the spirit and scope of the embodiments as defined by the following claims.

What is claimed:

1. A tensioner for a power transmission belt that operates on an endless path, the tensioner comprising:

an arm comprising a belt engaging section and a housing section;

a support member for securing the tensioner relative to the belt, the arm pivoting about the support member;

a spring that urges the arm to pivot about the support member in a first direction and urges the belt engaging section against the belt with a force to tension the belt;

a cavity between the arm and the support member; and a bushing comprising a bowed flange positioned in the cavity wherein the bowing of the flange biases the bushing axially along a longitudinal axis.

2. The tensioner of claim 1, the bushing further comprising cutout sections in the bowed flange.

3. The tensioner of claim 1, wherein the bushing is made of a nylon material.

4. The tensioner of claim 1, wherein the bushing is made of a moldable material.

5. The tensioner of claim 1, wherein the bushing has an inner surface comprising a fixed diameter and an outer surface that is tapered.

6. The tensioner of claim 1, wherein the spring is a flat, spiral wound spring.

7. The tensioner of claim 1, wherein the spring comprises a free wound end.

8. The tensioner of claim 1, wherein the support member comprises a housing for the spring.

9. The tensioner of claim 1, wherein the support member comprises a hub about which the arm pivots.

10. The tensioner of claim 1, wherein the belt engaging section includes a pulley.

11. A method of utilizing a tensioner for a power transmission belt that operates on an endless path, the method comprising the steps of:
   providing an arm comprising a belt engaging section and a housing section;
   providing a support member for securing the tensioner relative to the belt, the arm pivoting about the support member;
   providing a spring that urges the arm to pivot about the support member in a first direction and urges the belt engaging section against the belt with a force to tension the belt;
   providing a cavity between the arm and the support member; and
   providing a bushing comprising a bowed flange positioned in the cavity wherein the bowing of the flange biases the bushing axially along a longitudinal axis.

12. The method of claim 11, further comprising the step of cutting out sections from the bowed flange.

13. The method of claim 11, further comprising the step of making the bushing from a nylon material.

14. The method of claim 11, further comprising the steps of making the bushing from a moldable material.

15. The method of claim 11, further comprising the step of biasing the bushing axially along its longitudinal axis based on the bowed shape of the flange.

16. The method of claim 11, further comprising the steps of forming the bushing with a an inside surface comprising a fixed diameter and an outside surface that is tapered.

17. A tensioner for a power transmission belt that operates on an endless path, the tensioner comprising an arm including a belt engaging section and a housing section, a support member securing the tensioner relative to the belt, the support member comprising a hub having a longitudinal axis and being fixed from movement relative to the belt engaging section, the hub moveably holding the arm, a spring operatively interconnected to the arm and the support member, the spring being configured to urge the belt engaging section relative to the support member and against the belt with a force to tension the belt, the improvement wherein the tensioner further comprises:
   a cavity between the arm and the support member; and
   a bushing comprising a bowed flange positioned in the cavity wherein the bowed flange biases the bushing against the arm.

18. The tensioner of claim 17, wherein the bushing comprises an inside surface with a fixed diameter and a tapered outer surface.

* * * * *